(12) United States Patent
Kwag et al.

(10) Patent No.: US 8,987,387 B2
(45) Date of Patent: Mar. 24, 2015

(54) INTERFACIAL POLYMER FOR RUBBER-SILICA NETWORK

(71) Applicants: Korea Kumho Petrochemical Co., Ltd., Seoul (KR); Institute for Research & Industry Cooperation, PNU, Busan (KR)

(72) Inventors: Gwang Hoon Kwag, Daejeon (KR); Jong Yeop Lee, Busan (KR); Jae Yun Kim, Daejeon (KR); Han Baek Lee, Gyeonggi-do (KR); Sang Chul Ji, Incheon (KR); Hyun Jong Paik, Busan (KR); Won Ho Kim, Busan (KR); Hee Jeong Kim, Ulsan (KR); Ki Hyun Kim, Busan (KR)

(73) Assignees: Korea Kumho Petrochemical Co., Ltd., Seoul (KR); Institute for Research & Industry Cooperation, PNU, Busan (KR)

( * ) Notice: Subject to any disclaimer, the term of this patent is extended or adjusted under 35 U.S.C. 154(b) by 159 days.

(21) Appl. No.: 13/623,426

(22) Filed: Sep. 20, 2012

(65) Prior Publication Data

US 2013/0289209 A1 Oct. 31, 2013

(30) Foreign Application Priority Data

Apr. 30, 2012 (KR) .................. 10-2012-0045118

(51) Int. Cl.
| | |
|---|---|
| C08F 255/08 | (2006.01) |
| C08F 257/02 | (2006.01) |
| C08F 236/10 | (2006.01) |
| C08F 297/04 | (2006.01) |
| C08L 9/06 | (2006.01) |
| C08F 290/06 | (2006.01) |
| C08F 293/00 | (2006.01) |

(52) U.S. Cl.
CPC ............. *C08F 236/10* (2013.01); *C08F 297/04* (2013.01); *C08L 9/06* (2013.01); *C08F 290/062* (2013.01); *C08F 293/005* (2013.01)

USPC ....................................... 525/333.3; 525/333.7

(58) Field of Classification Search
None
See application file for complete search history.

(56) References Cited

U.S. PATENT DOCUMENTS

| | | | |
|---|---|---|---|
| 6,841,648 B2 | 1/2005 | Grun et al. | |
| 6,906,152 B2 | 6/2005 | Saito et al. | |
| 6,967,739 B2 | 11/2005 | Tanimoto | |
| 7,241,842 B2 | 7/2007 | Nakamura et al. | |
| 7,342,070 B2 | 3/2008 | Tsukimawashi et al. | |
| 7,485,684 B2 | 2/2009 | Parker | |
| 7,528,199 B2 | 5/2009 | Taniguchi et al. | |
| 2003/0114612 A1* | 6/2003 | Grun et al. .................... | 526/204 |
| 2004/0054110 A1* | 3/2004 | Grun et al. .................... | 526/335 |

FOREIGN PATENT DOCUMENTS

| | | | |
|---|---|---|---|
| JP | 2009-269949 A | * | 11/2009 |
| KR | 10-2003-0014107 A | | 2/2003 |
| KR | 1020030014107 A | | 2/2003 |

OTHER PUBLICATIONS

Fengxiao Guo et al., Langmuir Article, Surface Modification of Nanoporous 1,2-Polybutadiene by Atom Transfer Radical Polymerization or Click Chemistry, 2010, pp. 2008-2013, vol. 26(3), American Chemical Society.

* cited by examiner

*Primary Examiner* — Robert Sellers
(74) *Attorney, Agent, or Firm* — Frommer Lawrence & Haug LLP; Ronald R. Santucci

(57) ABSTRACT

Disclosed is an interfacial polymer for a network used as a coupling agent in mixing of rubber-silica. More particularly, the interfacial polymer for a rubber-silica network is a block copolymer containing a copolymer of conjugated diene and vinyl aromatic monomers, in which when used as a coupling agent in the mixing of synthetic rubber and silica (an inorganic material), the polymer enhances silica dispersibility within the rubber, and improves compatibility and processability, resulting in considerable improvement in the dynamic property as well as the mechanical property of the rubber, and when used in a tire, etc., it enhances automobile braking performance and reduces rolling resistance.

5 Claims, 14 Drawing Sheets

US 8,987,387 B2

INTERFACIAL POLYMER FOR RUBBER-SILICA NETWORK

CROSS-REFERENCE TO RELATED APPLICATION

This application claims under 35 U.S.C. §119(a) the benefit of Korean Patent Application No. 10-2012-0045118 filed on Apr. 30, 2012, the entire contents of which are incorporated herein by reference.

BACKGROUND (a) Technical Field

The present invention relates to an interfacial polymer for a network used as a coupling agent in mixing of rubber-silica. More particularly, the present invention relates to an interfacial polymer for a rubber-silica network, that is, a block copolymer containing a copolymer of conjugated diene and vinyl aromatic monomers, in which when used as a coupling agent in the mixing of synthetic rubber and silica (an inorganic material), the polymer enhances silica dispersibility within the rubber, and improves compatibility and processability, resulting in considerable improvement in the dynamic property as well as the mechanical property of the rubber, and when used in a tire, etc., it enhances automobile braking performance and reduces rolling resistance.

(b) Background Art

In the case of styrene-butadiene rubber prepared by a solution polymerization method frequently used in the tire industry, it is possible to freely adjust the vinyl structure of butadiene, the styrene content, and the styrene molecular block rate according to tire requirements such as rolling resistance and wet traction. Thus, the styrene-butadiene rubber is frequently used in a tire tread. Also, in the styrene-butadiene rubber prepared by the solution polymerization method, it is easy to introduce several functional groups into a molecular end using organolithium catalyst.

Such introduction of functional groups into rubber increases the compatibility with an inorganic filler reinforcing material, that is, carbon black or silica. This improves the tread wear resistance of a tire, and thus improves durability of the tire. Further, it is possible to reduce rolling resistance, thereby improving the fuel efficiency of an automobile, and to improve the wet traction characteristic, thereby shortening an automobile braking distance.

In general, it is known that a silica reinforcing material is excellent in rolling resistance and wet traction characteristics as compared to carbon black. However, In the case of general rubber containing a vinyl monomer aromatic monomer and a conjugated diene copolymer, when the rubber is mixed with silica, its compatibility is known to be reduced. This is because unlike carbon black, hydrophilic silica is not sufficiently mixed with hydrophobic rubber, and thus the silica is not uniformly dispersed within the rubber.

In general, in order to solve such incompatibility between rubber-silica, a silane coupling agent having an alkoxy group is mainly used. Representatively, bis(triethoxysilylpropyl) tetrasulfide, called "Si69" (Degussa) is used. When such a silane coupling agent is used, an alkoxysilyl group reacts with a hydroxyl group on silica surface, resulting in a silane coupling reaction, and sulfur is cross-linked with rubber, thereby improving compatibility. This allows the rubber and the silica to be mixed.

A tire (hereinafter, referred to as silica tire) that uses the rubber mixed with the silica, as described above, seems to be excellent in wet traction and rolling resistance characteristics as compared to carbon black tire. Also, such characteristics of the tire are known to be improved in proportion to dispersion of silica within the rubber.

However, such a silane coupling agent is expensive, and also causes a volatile material during mixing. Further, it has a limitation in finely dispersing silica within rubber. Thus, the agent itself has a difficulty in showing physical properties of a high performance silica tire.

Due to carbon dioxide emissions control and automobile fuel consumption control, following global warming, the development of a silica tire of low fuel consumption and high performance has been recently more spotlighted. For this, in order to further improve compatibility of rubber-silica, besides the above described method of using a coupling agent such as Si69, there have been reported methods of more uniformly dispersing silica by introducing a functional group capable of giving hydrophilicity, into rubber.

U.S. Pat. Nos. 6,906,152 and 6,967,739 disclose the mixing of conjugated diene-based rubber modified with a multivalent glycidyl amino group, with silica, which can improve wet traction and rolling resistance properties.

Also, U.S. Pat. No. 7,241,842 discloses a technology of introducing a polyorganosiloxne functional group in synthesis of conjugated diene-based rubber, thereby reducing heat build up during mixing with silica, and improving wet traction and tread wear characteristics.

Also, U.S. Pat. Nos. 7,342,070 and 7,528,199 disclose a technology of using modified rubber which is added with an amino functional group including an alkoxysilyl group in a styrene-butadiene copolymer reaction, in which when a mixture of such modified rubber and silica is applied to a tire tread, physical properties of a tire can be improved due to low hysteresis.

Also, U.S. Pat. No. 6,841,648 discloses a technology of introducing a silyl ether functional group containing a carbamic acid chloride-based functional group and an epoxy group, into a styrene-butadiene copolymer, thereby improving wet traction and rolling resistance characteristics.

Also, U.S. Pat. No. 7,485,684 discloses a technology of introducing a nitrone functional group into the end of a styrene-butadiene copolymer, thereby improving a rolling resistance characteristic.

However, even In the case of the conjugated diene polymer introduced with a functional group, disclosed in the above patents, only when a silane coupling agent, such as expensive Si69, is applied in a large amount during mixing with silica, physical property improvement is expected. Also, in many cases where a functional group is introduced into a conjugated diene polymer, the functional group is introduced into both ends of the polymer or the middle of the polymer chain through a coupling reaction. In such cases, since it is difficult to introduce sufficient functional groups, there is a limitation in improving the compatibility with silica. Further, introducing functional groups can cause side-reactions, thereby making it difficult to perform the control of Mooney viscosity in a commercialization process, and the operation during purification process.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In order to solve the above mentioned conventional problems, the inventors have conducted studies for a long time. As a result, they found that In the case of a block copolymer obtained by modifying a copolymer containing conjugated diene and vinyl aromatic monomers with a hydrophilic acrylate compound or a glycidyl group-containing compound, the compatibility with silica is very high. Then, based on this finding, they have completed this invention.

Accordingly, an object of the present invention is to provide an interfacial polymer for a rubber-silica network, which highly improves the compatibility with silica within rubber.

Also, another object of the present invention is to provide an interfacial polymer for a rubber-silica network, which is applied as a surfactant in mixing of rubber-silica and then forms a preferable network, thereby improving the mechanical property and the dynamic property of the rubber.

In one aspect, the present invention provides an interfacial polymer for a rubber-silica network, including a block copolymer selected from Formulas 1 to 4 below, the block copolymer being obtained by modifying a copolymer containing conjugated diene alone or conjugated diene and vinyl aromatic monomers with an acrylate compound or a glycidyl group-containing compound.

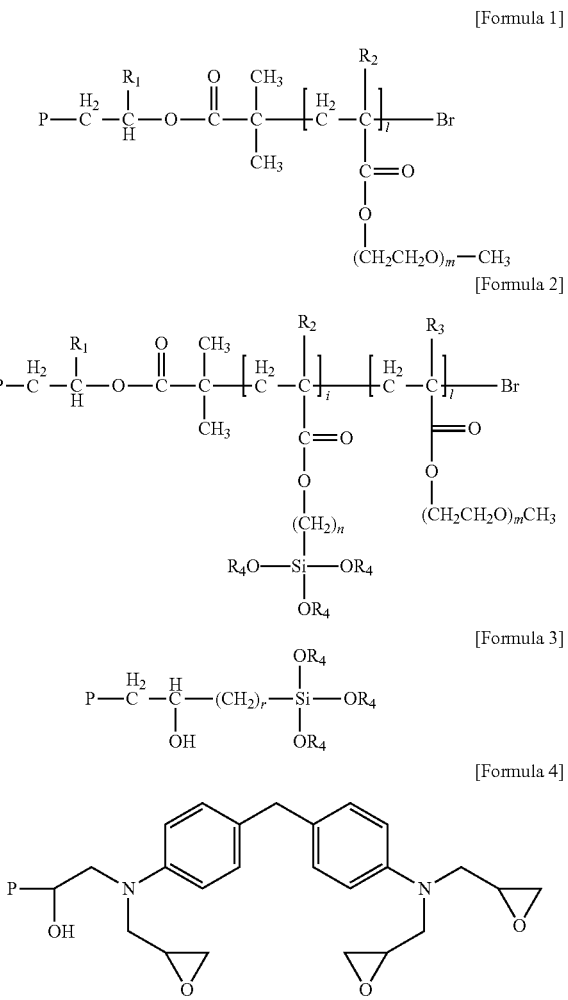

[Formula 1]
[Formula 2]
[Formula 3]
[Formula 4]

In Formulas 1 to 4, P represents a copolymer of conjugated diene alone or conjugated diene and vinyl aromatic monomers; $R_1$ represents hydrogen or a C1 or C2 alkyl group; $R_2$ and $R_3$ each independently represents hydrogen or a C1 to C4 alkyl group; $R_4$ represents a C1 to C5 alkyl group; n and r each independently represents an integer of 1 to 5; m represents an integer of 1 to 50; and l and i each independently represents an integer of 1 to 100.

Other aspects and exemplary embodiments of the invention are discussed infra.

The above and other features of the invention are discussed infra.

When the inventive interfacial polymer including a block copolymer represented by Formulas 1 to 4 is added in the mixing of rubber and silica, the compatibility between rubber and silica is improved, thereby improving the mechanical property and the dynamic property of the rubber. Thus, when such rubber is applied in a tire, and mounted in an automobile, it is possible to achieve an improved effect in fuel efficiency and wet skid resistance characteristics during driving of the automobile.

Especially, when the rubber is applied in an automobile tire, it is possible to reduce rolling resistance, thereby improving the fuel efficiency of an automobile, and to improve the wet traction characteristic, thereby shortening a braking distance. Thus, it is possible to manufacture a tire with high performance and low fuel consumption.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
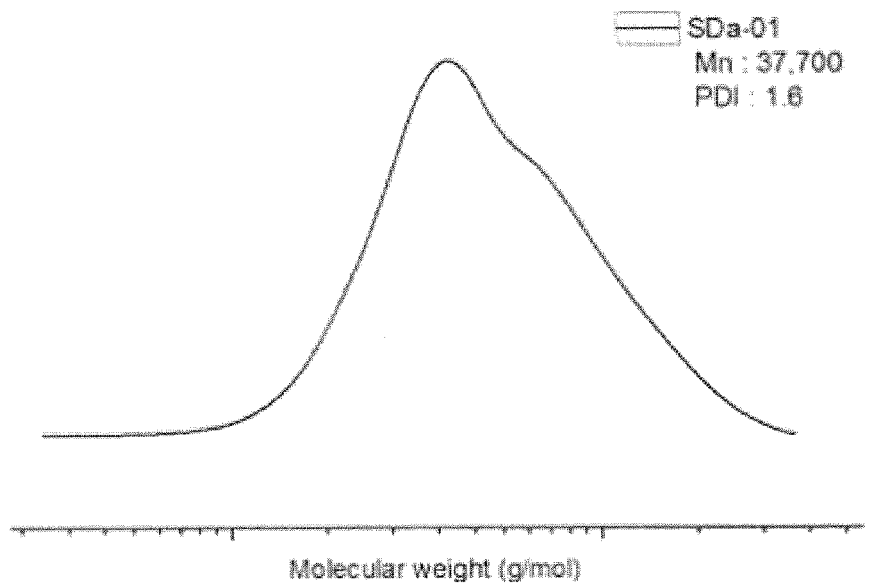
FIGS. 1 and 2 show graphs of GPC and NMR analysis results, respectively, on a polymer synthesized in Example 1 of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, one embodiment of the present invention will be described in detail.

An interfacial polymer for a rubber-silica network, according to the present invention, is characterized in that it includes a block copolymer selected from Formulas 1 to 4 above, the block copolymer being obtained by modifying a copolymer containing conjugated diene or conjugated diene and vinyl aromatic monomer with an acrylate compound or a glycidyl group-containing compound through radical polymerization.

The inventive interfacial polymer for the rubber silica network of Formulas 1 to 4 may be used as a coupling agent in the mixing of rubber and silica.

According to the present invention, the block copolymer of Formula 1 may be prepared by subjecting a copolymer (P) including conjugated diene or conjugated diene and vinyl aromatic monomers to anionic polymerization by introduction of epoxide, introducing 2-bromoisobutyryl bromide to the resultant product to prepare a compound of Formula 5 below, and polymerizing the compound of Formula 5 with a polyethylene glycol-containing acrylate compound of Formula 6 below.

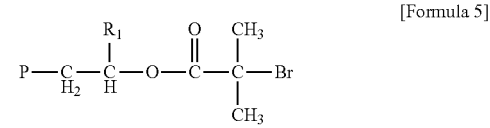
[Formula 5]

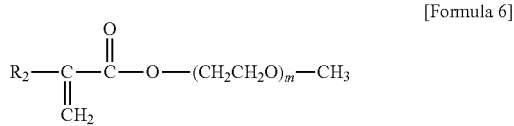
[Formula 6]

In Formulas above, P, $R_1$, $R_2$ and m are the same as those defined in Formulas 1 to 4 above.

Also, the block copolymer of Formula 2 may be prepared by subjecting a copolymer (P) including conjugated diene or conjugated diene and vinyl aromatic monomers to anionic polymerization by introduction of epoxide, introducing 2-bromoisobutyryl bromide to the resultant product to prepare a compound of Formula 5 above, and polymerizing the compound of Formula 5 with an alkoxysilyl group-containing acrylate compound of Formula 7 below, and then with a polyethylene glycol-containing acrylate compound of Formula 6 above. The compound of Formula 2, as prepared above, is a polymer containing a mixture of Formulas 6 and Formula 7 below, in which an acrylate-polymerized block is combined with an alkoxysilyl group-containing acrylate compound of Formula 7 below.

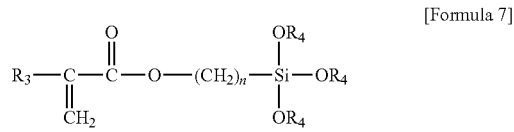
[Formula 7]

In Formula above, $R_3$, $R_4$, and n are the same as those defined in Formulas 1 to 4 above.

According to the present invention. Formulas 6 and Formula 7 above, introduced in the preparation of Formula 2 above, have a molar ratio of 1:10, and preferably of 1:5. Also, the copolymer of Formula 2 above is obtained by polymerizing Formula 7 and Formula 6 in a random, tapered or block architecture.

Formula 6 above, used in the present invention, has a weight-average molecular weight of 150 to 2500, and more preferably 200 to 1,500.

Also, the inventive block copolymer of Formula 3 above may be prepared as an end-modified copolymer, by polymerizing a copolymer (P) containing conjugated diene or conjugated diene and vinyl aromatic monomers with a compound containing an alkoxysilyl group and a glycidyl group, represented by Formula 8.

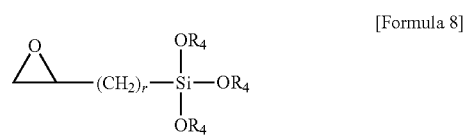
[Formula 8]

In Formula above, $R_4$ and r are the same as those defined in Formulas 1 to 4 above.

Also, the inventive block copolymer of Formula 4 above may be prepared as an end-modified compound, by polymerizing a copolymer (P) containing conjugated diene or conjugated diene and vinyl aromatic monomers with a compound containing a tetra glycidyl group, represented by Formula 9.

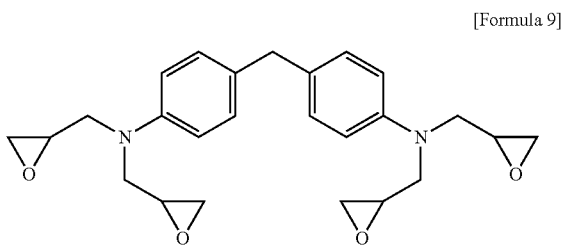 [SMILES: c1cc(N(CC2CO2)CC2CO2)ccc1Cc1ccc(N(CC2CO2)CC2CO2)cc1]
[Formula 9]

The inventive polymers of Formulas 1 to 4, as prepared above are characterized in that they include a block copolymer of hydrophilic compounds having high silica compatibility, represented by Formula 5 and Formula 6, with a hydrophobic copolymer (P) having high rubber compatibility, and a block copolymer of Formula 5, Formula 6, and Formula 7, with P, a block copolymer of Formula 8 with P, and a block copolymer of Formula 9 with P. Herein, the P copolymer and the compounds of Formulas 6 and Formula 7 are polymerized in a random, tapered or block architecture.

From among these block copolymers, the polymers of Formulas 1 and 2 may be prepared by first synthesizing the compound of Formula 5 through an anionic polymerization of a copolymer (P) containing conjugated diene alone or conjugated diene and vinyl aromatic monomers, and performing Atom Transfer Radical Polymerization (ATRP) on the compound of Formula 5 together with an acrylate compound of Formula 6 or 7.

Also, the polymers of Formulas 3 and 4 may be prepared by modifying an end of a copolymer(P) containing conjugated diene alone or conjugated diene and vinyl aromatic monomers with a compound of Formula 8 or 9 through an anionic reaction of anionic polymerization.

Meanwhile, according to the present invention, in Formula 1 or 2 above, P represents a copolymer of conjugated diene alone or conjugated diene and vinyl aromatic monomers, and is polymerized in a random, tapered or block architecture. Herein, vinyl aromatic monomers are preferably styrene, and also may be one or a mixture of two kinds selected from the group including alpha-methylstyrene, p-methylstyrene, o-methylstyrene, p-tert-butylstyrene, dimethylstyrene, vinyltoluene, vinylxylene, diphenylethylene and vinyl naphthalene. As conjugated diene, butadiene or isoprene may be used alone or in combination.

According to a preferable embodiment of the present invention, P has a weight-average molecular weight of 1,000 to 500,000, and more preferably 1,000 to 200,000. When the weight-average molecular weight is less than 1,000 or greater than 500,000, it is not advantageous in manufacturing products. Also, although mixed with rubber-silica, the inventive interfacial polymer as prepared above is not helpful for dispersion of silica.

In the polymerization of the P polymer used in the present invention, conjugated diene or conjugated diene and vinyl aromatic monomers are introduced in an inert hydrocarbon solvent, and then an organolithium initiator is used to perform the polymerization. Herein, before polymerization initiation, in order to improve a reaction rate, to adjust a vinyl content of a conjugated diene polymer, and to adjust a random polymerization rate of vinyl aromatic monomers and conjugated diene, a polar compound, Lewis base, may be introduced in a small amount. As such Lewis base, one or a mixture of two kinds selected from the group including ethers such as tetrahydrofuran, diethyl ether, diethyleneglycol, and dimethyl ether, and tertiary amines such as N,N,N,N'-tetramethylethylenediamine, triethylamine may be used. Also, as a hydrocarbon solvent, hexane, heptane, cyclohexane, benzene, toluene or the like may be used, and as an organolithium initiator, alkyllithium, e.g., n-butyllithium, sec-butyllithium, and the like, may be used.

Also, within the polymer P, the content of vinyl aromatic monomers may be 0-70 wt %, and more preferably 10-50 wt %. When the content of vinyl aromatic monomers is greater than 70 wt %, the hardness of rubber is increased as does in plastic resin. Thus, the rubber's own characteristics are lost. This is disadvantageous in mixing of rubber-silica.

The polymer of Formula 5, used in polymerization in the present invention may be preferably polymerized by introducing epoxide corresponding to molar equivalents of organolithium initiator into a copolymer of conjugated diene alone or conjugated diene and vinyl aromatic monomers in a state where activity of living polymer is valid after completion of copolymerization of the copolymer, followed by reaction for 5 to 20 minutes, and introducing the same molar equivalents of 2-bromoisobutyryl bromide thereto, thereby finishing the polymerization with Formula 5.

As the epoxide used in polymerization using Formula 5, ethylene oxide, propylene oxide, butylenes oxide or the like may be preferably used.

Respective steps of the polymerization may be performed in both a constant temperature condition and an adiabatic condition. The reaction temperature may range from 0 to 150° C., and preferably from 20 to 100° C. At less than 0° C., the reaction is not commercially preferable due to a reduced reaction rate. At greater than 150° C., due to a rapidly increased temperature, it is difficult to control the reaction temperature, and a side-reaction such as gelation is likely to occur.

In the present invention, the compound of Formula 5 is a novel compound as an intermediate used in the preparation of Formula 1 or Formula 2 from the copolymer (P) of conjugated diene alone or conjugated diene and vinyl aromatic monomers.

In the present invention, the compound of Formula 6 used in the preparation of Formula 1 or 2 is an acrylate compound containing polyethylene glycol. As monomers for Formula 6, PEGMA300 (polyethyleneglycolmethacrylate 300) is preferable. Further, as the monomers, monomers of other kinds of acrylate compounds containing polyethylene glycol may be used in combination. Especially, as the compound of Formula 7 used in the preparation of Formula 2, 3-(trimethoxysilyl) propyl methacrylate is preferable, which is an alkoxysilyl group-containing acrylate compound. Further, other kinds of acrylic monomer compounds containing an alkoxysilyl group may be used alone or in combination.

In Formula 1 or 2, I and i each preferably range from 1 to 100. When the molecular weight is too high, it is not helpful in dispersion of silica during mixing of rubber-silica.

According to the present invention, using the polymer P, Formula 1 or 2 is polymerized. Herein, a transition metal complex containing a transition metal compound (Mtn$^+$ Xn) and a ligand (L) may be added together with an organic material within an organic solvent.

Herein, a transition metal (Mtn$^+$) constituting the transition metal compound may be any one selected from the group including $Cu^{1+}$, $Cu^{2+}$, $Fe^{2+}$, $Fe^{3+}$, $Ru^{2+}$, $Ru^{3+}$, $Cr^{2+}$, $Cr^{3+}$, Mo0, Mo$^+$, Mo$^{2+}$, Mo$^{3+}$, W$^{2+}$, W$^{3+}$, Rh$^{3+}$, Rh$^{4+}$, Co$^+$, Co$^{2+}$, R$^{2+}$, R$^{3+}$, Ni0, Ni$^+$, Mn$^{3+}$, Mn$^{4+}$, V$^{2+}$, V$^{3+}$, Zn$^+$, Zn$^{2+}$, Au$^+$, Au$^{2+}$, Ag$^+$ and Ag$^{2+}$. Also, in the transition metal compound, X represents any one selected from the group including halogen, C1 to C6 alkoxy, $(SO_4)1/2$, $(PO_4)1/3$, $(HPO_4)1/2$, $(H_2PO_4)$, triflate, hexafluorophosphate, methanesulfonate, aryl sulfonate, SeR$^1$, CN and R$^2CO_2$. Herein, R$^1$ represents aryl or a C1 to C20 straight or branched alkyl group, R$^2$ represents H or a C1 to C6 straight or branched alkyl group, and n represents a formal charge of a transition metal and an integer of $0 \leq n \leq 7$.

In the present invention, as an organic solvent used in ATRP (Atom Transfer Radical Polymerization), an organic solvent which does not cause a radical transfer reaction may be used. For example, any one selected from the group including aromatic solvents (such as benzene, toluene, and anisole), alcohols, water, THF, acetone and ethyl acetate may be used.

In the polymerization, GPC is measured hourly while the reaction is proceeded according to the molecular weight (length), and by oxidizing the transition metal compound the reaction is finished.

The polymerization may be performed in both a constant temperature condition and an adiabatic condition. The reaction temperature may range from 0 to 150° C., and preferably from 15 to 120° C. At less than 0, the reaction is not commercially preferable due to a reduced reaction rate. At greater than 150° C., a side-reaction such as solvent vaporization or self-initiation of monomers is likely to occur.

Also, Formula 3 or 4 may be prepared in the similar manner as described in that of Formula 1 or 2, in which a polymerization initiator, Lewis base, a transition metal compound, and the like are used, and the similar reaction condition is employed.

As described above, according to the present invention, the block copolymer of Formulas 1 to 4 is added as a coupling agent in the mixing of rubber and silica. This allows silica to be finely and uniformly dispersed in general vinyl monomer-conjugated diene copolymer rubber not containing a functional group as well as vinyl monomer-conjugated diene copolymer rubber introduced with a functional group. Then, when a rubber-silica mixture in which silica is finely dispersed is applied in a tire, it is possible to improve a dynamic property as well as a mechanical strength. Thus, it is possible to manufacture a tire which is excellent in tire wear resistance and stop and fuel efficiencies of an automobile, etc. In other words, when added during mixing of synthetic rubber made of a styrene-butadiene copolymer, and silica as an inorganic material, the inventive polymer may be utilized as a polymer highly appropriate for constitution of a rubber-silica network. Further, the inventive polymer can enhance dispersibility of silica within rubber, thereby highly improving compatibility and processability. Accordingly, due to such improvement of silica dispersibility, when the inventive polymer is especially applied in the preparation of a tire, it is possible to reduce rolling resistance, thereby improving the fuel efficiency of an automobile, and to improve the wet traction characteristic, thereby improving an automobile braking performance.

EXAMPLES

The following examples illustrate the invention and are not intended to limit the same.

Example 1

Under nitrogen atmosphere, a 2 L stainless reactor was charged with cyclohexane 800 g, ditetrahydrofurylpropane 0.08 g, styrene 64 g and butadiene 96 g, and then at a reactor temperature 35° C., n-butyllithium 14 mmol was charged to the reactor, followed by an adiabatic warming reaction. 10 min after the reaction temperature reached the peak temperature, ethyleneoxide 1.6 g was introduced thereto, followed by an additional reaction for 10 min. In that state, the reactor temperature was lowered down to 35° C., and then 2-bromoisobutyryl bromide 8.0 g was added thereto to prepare the polymer of Formula 5. Through GPC analysis, it was determined that the weight-average molecular weight was 14,000, and through H-NMR analysis, it was determined that the content of styrene was 41 wt %, the vinyl content of butadiene was 15 wt %.

Figure 2:
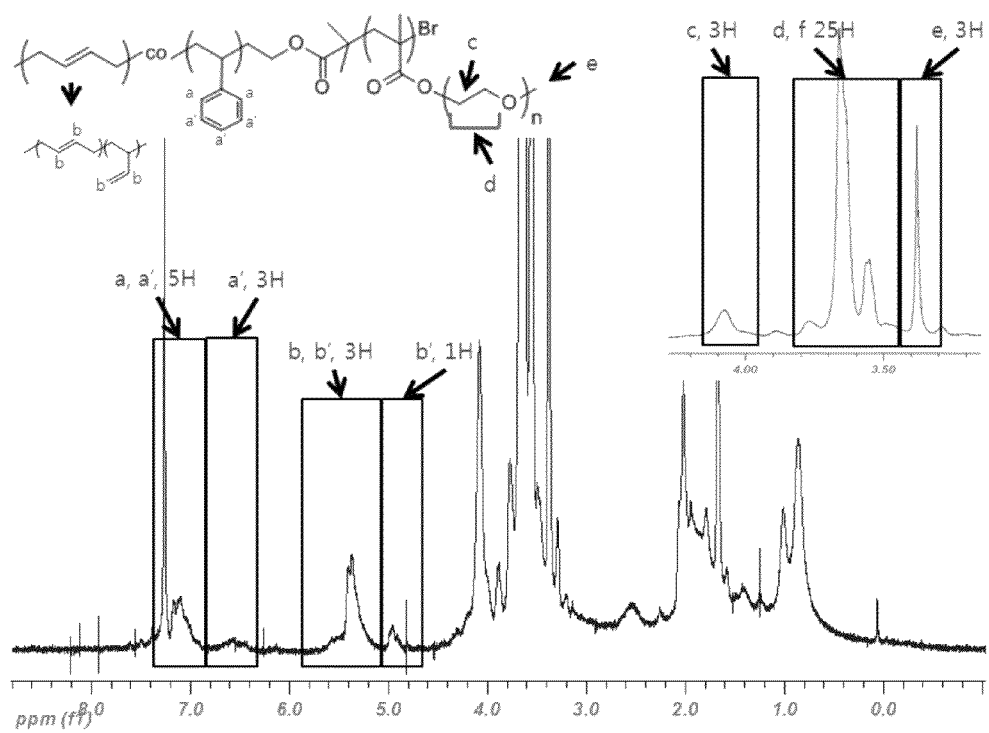

In the charging of [PEGMA300]/[Formula5]/[CuBr]/[PMDETA]/[CuBr$_2$] (in a ratio of 200:1:2:2:0.1) into a dried 100 mL Schlenk flask, CuBr and CuBr2 were charged first. An inlet was connected to a vacuum pump, thereby placing the flask in a vacuum state, and then nitrogen was charged thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA, was dried in a vacuum oven for 24 h. The results are noted in Table 1, and GPC and NMR analysis results are shown in FIGS. 1 and 2.

Example 2

Under nitrogen atmosphere, a 2 L stainless reactor was charged with cyclohexane 800 g, ditetrahydrofurylpropane 0.08 g, styrene 64 g and butadiene 96 g, and then at a reactor temperature 35° C., n-butyllithium 14 mmol was charged to the reactor, followed by an adiabatic warming reaction. 10 min after the reaction temperature reached the peak temperature, ethylene oxide 0.8 g was introduced thereto, followed by an additional reaction for 10 min. In that state, the reactor temperature was lowered down to 35° C., and then 2-bromoisobutyryl bromide 4.0 g was added thereto to prepare the polymer of Formula 5. Through GPC analysis, it was determined that the weight-average molecular weight was 14,000, and through H-NMR analysis, it was determined that the content of styrene was 41 wt %, the vinyl content of butadiene was 16 wt %.

Figure 3:
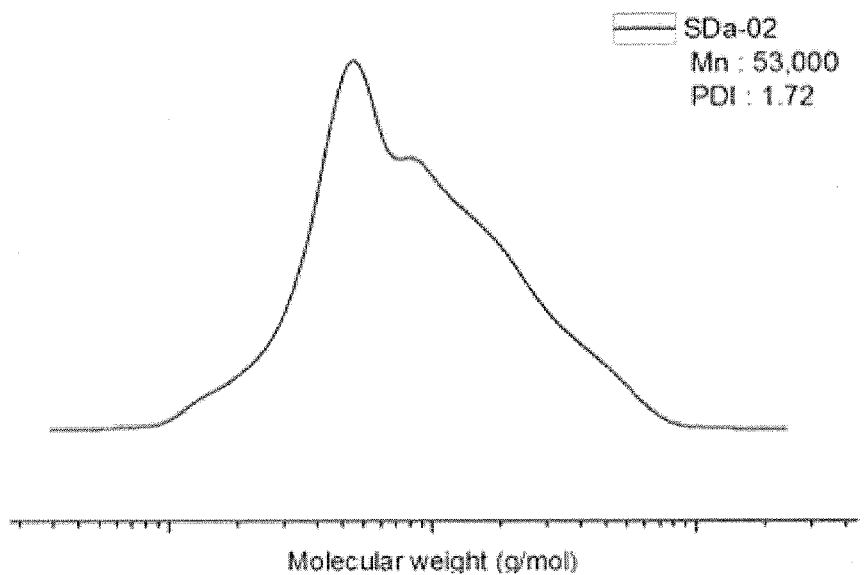
FIGS. 3 and 4 show graphs of GPC and NMR analysis results, respectively, on a polymer synthesized in Example 2 of the present invention.
Figure 4:
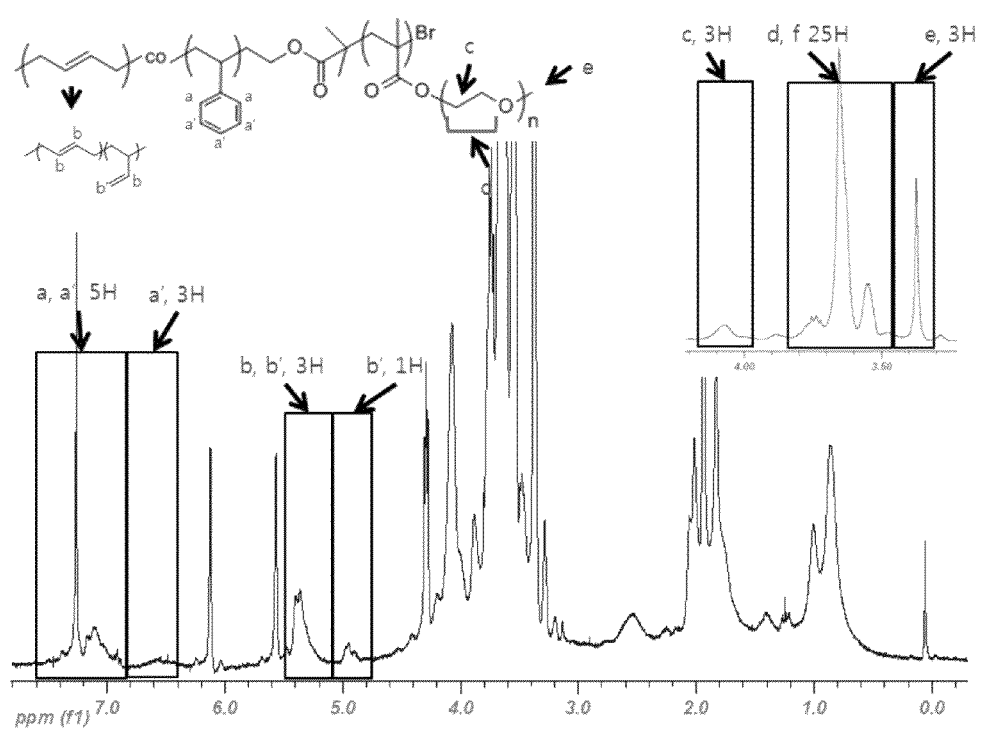

In the charging of [PEGMA300]/[Formula5]/[CuBr]/[PMDETA]/[CuBr$_2$] (in a ratio of 200:1:2:2:0.1) into a dried 100 mL Schlenk flask, CuBr and CuBr$_2$ were charged first. An inlet was connected to a vacuum pump, thereby placing the flask in a vacuum state, and then nitrogen was charged again thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA (Formula 1), was dried in a vacuum oven for 24 h. The results are noted in Table 1, and GPC and NMR analysis results are shown in FIGS. 3 and 4. In butadiene, 1,4-addition and 1,2-addition are randomly polymerized, which show peaks at 5.0~5.7 ppm. At 5.45~5.7 ppm, a proton peak (b) is shown, which indicates 2H of 1,4-addition and 1H of 1,2-addition. At 5~5.45 ppm, a proton peak (b') is shown, which indicates 1H of 1,2-addition.

Styrene together with butadiene may form a random polymer. Otherwise, styrene may be mixed with homopolymer polystyrene. Its peaks are shown at 6.2~7.5 ppm. Styrene randomly polymerized with butadiene shows a peak at 6.8~7.4 ppm (a, 2H). Homopolymer styrene shows a peak at 6.8~7.4 ppm (a', 3H) and a peak at 6.2~6.8 ppm (a', 2H). In PEGMA, the first proton (c) of ethylene oxide is shown at 4.0~4.1 ppm, the proton (d) of other repeating units is shown at 3.5~3.8 ppm. The proton peak (e) is shown at 3.3~3.4 ppm.

Example 3

Under nitrogen atmosphere, a 2 L stainless reactor was charged with cyclohexane 800 g, ditetrahydrofurylpropane 0.08 g, styrene 64 g and butadiene 96 g, and then at a reactor temperature 35° C., n-butyllithium 16 mmol was charged to the reactor, followed by an adiabatic warming reaction. 10 min after the reaction temperature reached the peak temperature, ethylene oxide 0.4 g was introduced thereto, followed by an additional reaction for 10 min. In that state, the reactor temperature was lowered down to 35° C., and then 2-bromoisobutyryl bromide 2.0 g was added thereto to prepare the polymer of Formula 5. Through GPC analysis, it was determined that the weight-average molecular weight was 10,000 and through H-NMR analysis, it was determined that the content of styrene was 41 wt %, the vinyl content of butadiene was 18 wt %.

Figure 5:
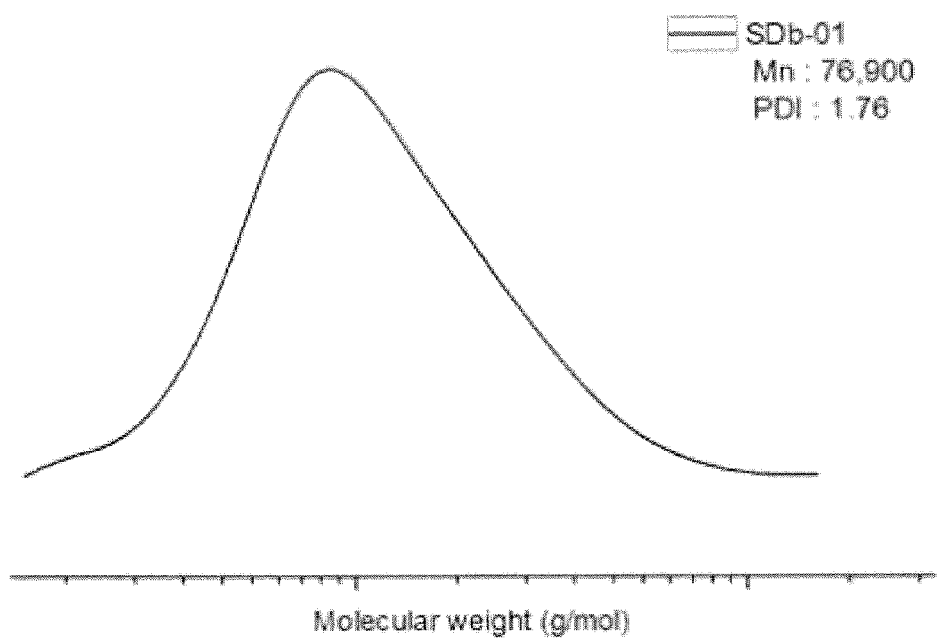
FIGS. 5 and 6 show graphs of GPC and NMR analysis results, respectively, on a polymer synthesized in Example 3 of the present invention.
Figure 6:
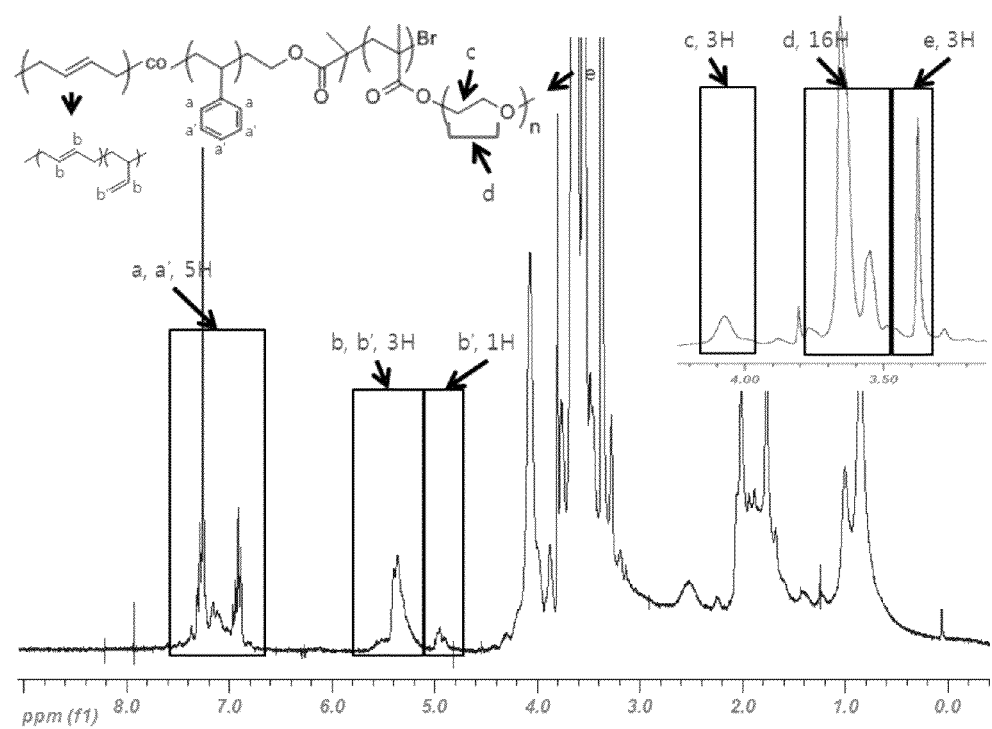

In the charging of [PEGMA300]/[Formula5]/[CuBr]/[PMDETA]/[CuBr2] (in a ratio of 200:1:2:2:0.1) into a dried 100 mL Schlenk flask, CuBr and CuBr2 were charged first. An inlet was connected to a vacuum pump, thereby placing the flask in a vacuum state, and then nitrogen was charged again thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA was dried in a vacuum oven for 24 h. The results are noted in Table 1, and GPC and NMR analysis results are shown in FIGS. 5 and 6.

Example 4

Under nitrogen atmosphere, a 2 L stainless reactor was charged with cyclohexane 800 g, ditetrahydrofurylpropane 0.02 g, styrene 64 g and butadiene 96 g, and then at a reactor temperature 35° C., n-butyllithium 16 mmol was charged to the reactor, followed by an adiabatic warming reaction., 10 min after the reaction temperature reached the peak temperature, ethylene oxide 0.08 g was introduced thereto, followed by an additional reaction for 10 min. In that state, the reactor temperature was lowered down to 35° C., and then 2-bromoisobutyryl bromide 0.4 g was added thereto to prepare the polymer of Formula 5. Through GPC analysis, it was determined that the weight-average molecular weight was 10,000 and through H-NMR analysis, it was determined that the content of styrene was 41 wt %, the vinyl content of butadiene was 17 wt %.

Figure 7:
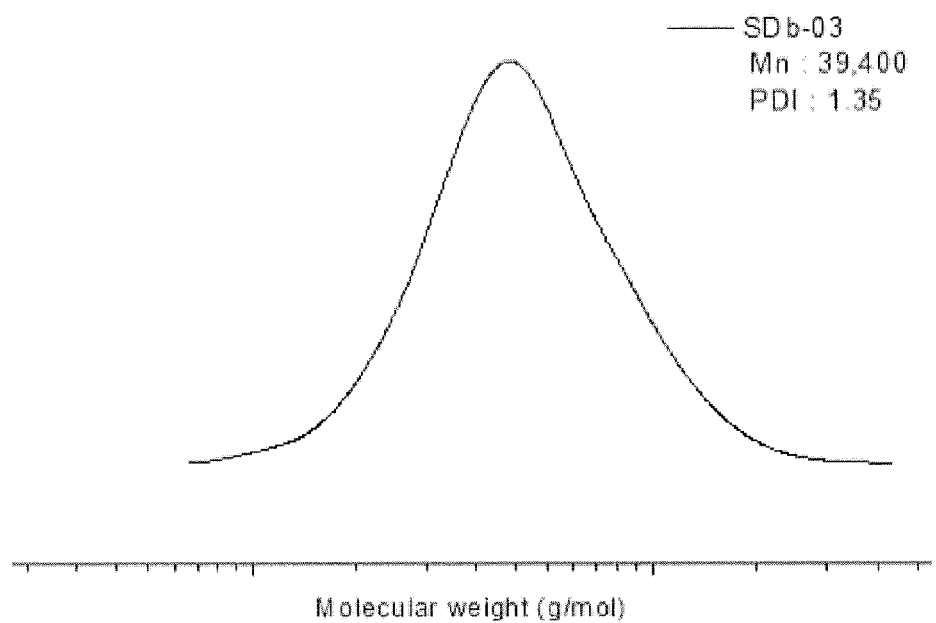
FIGS. 7 and 8 show graphs of GPC and NMR analysis results, respectively, on a polymer synthesized in Example 4 of the present invention.
Figure 8:
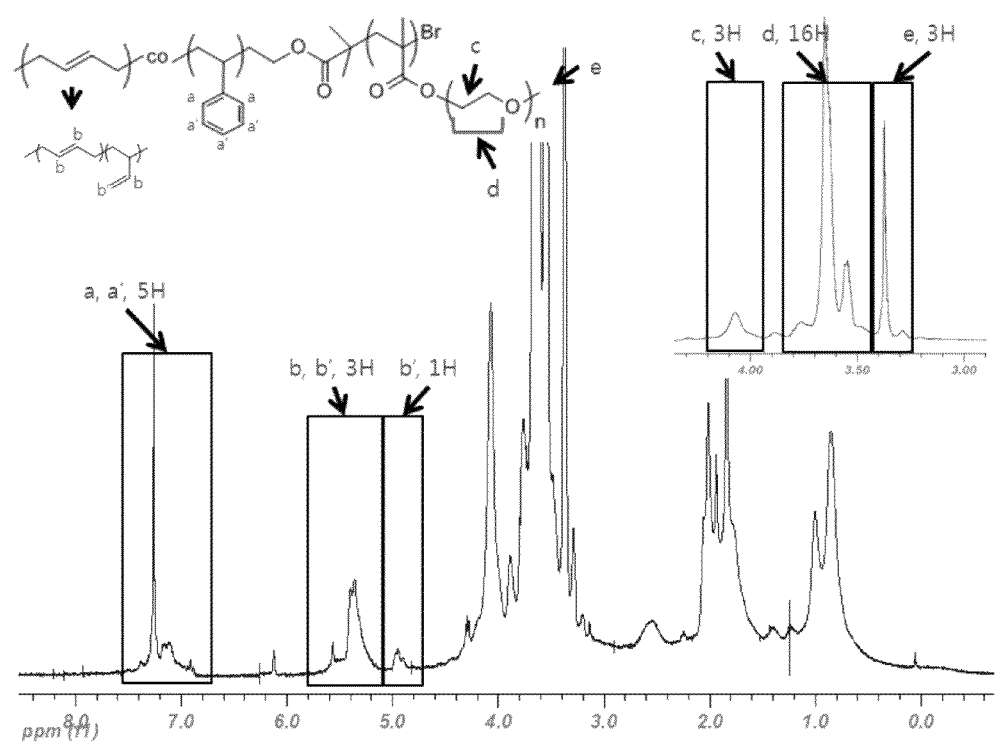

In the charging of [PEGMA300]/[Formula5]f[CuBr]/[PMDETA]/[CuBr2] (in a ratio of 200:1:2:2:0.1) into a dried 100 mL Schlenk flask, first, CuBr and CuBr2 were charged. An inlet was connected to a vacuum pump, thereby placing the flask in a vacuum state, and then nitrogen was charged again thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA, was dried in a vacuum oven for 24 h. The results are noted in Table 1, and GPC and NMR analysis results are shown in FIGS. 7 and 8.

Example 5

Under nitrogen atmosphere, a 2 L stainless reactor was charged with cyclohexane 800 g, ditetrahydrofurylpropane 0.08 g, styrene 64 g and butadiene 96 g, and then at a reactor temperature 35° C., n-butyllithium 16 mmol was charged to the reactor, followed by an adiabatic warming reaction. 10 min after the reaction temperature reached the peak temperature, ethylene oxide 1.6 g was introduced thereto, followed by an additional reaction for 10 min. In that state, the reactor temperature was lowered down to 35° C., and then 2-bromoisobutyryl bromide 8.0 g was added thereto to prepare the polymer of Formula 5. Through GPC analysis, it was determined that the weight-average molecular weight was 10,000, and through H-NMR analysis, it was determined that the content of styrene was 40 wt %, the vinyl content of butadiene was 16 wt %.

In the charging of [PEGMA300]/[Formula5]/[CuBr]/[PMDETA]/[CuBr2] in a ratio of 200:1:2:2:0.1 into a dried 100 mL Schlenk flask, CuBr and CuBr2 were charged first. An inlet was connected to a vacuum pump, thereby placing the flask in a vacuum state, and then nitrogen was charged again thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA (Formula1), was dried in a vacuum oven for 24 h.

Figure 9:
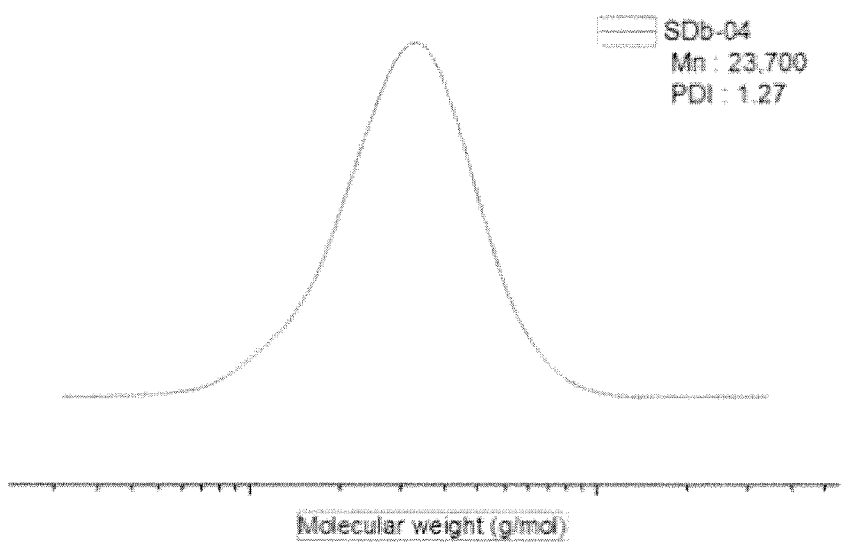
FIGS. 9 and 10 show graphs of GPC and NMR analysis results, respectively, on a polymer synthesized in Example 5 of the present invention.
Figure 10:
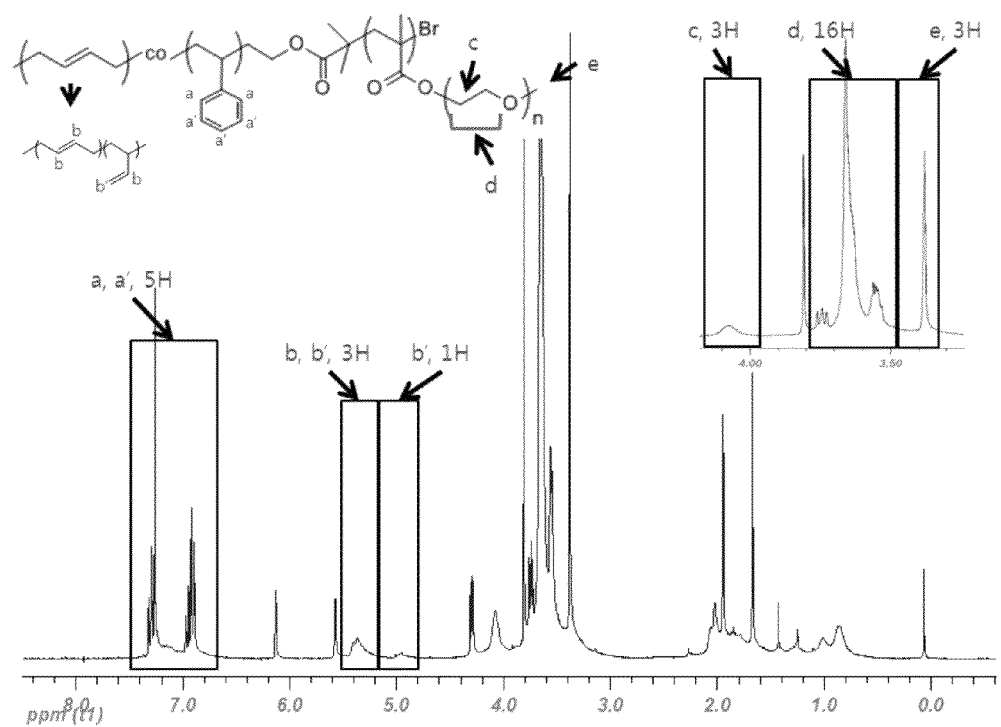

The results are shown as GPC and NMR analysis results in FIGS. 9 and 10.

TABLE 1

| Example | Sample | [PEGMA]:[Formula 5]:[CuBr]:[PMDETA]:[CuBr2] | Time (hr) | Mn (g/mol) | Mn/Mw |
|---|---|---|---|---|---|
| 1 | SDa-01 | 200:1:2:2:0.1 | 7 | 37,700 | 1.6 |
| 2 | SDa-02 | 200:1:2:2:0.1 | 8 | 53,000 | 1.72 |

TABLE 1-continued

| Example | Sample | [PEGMA]:[Formula 5]:[CuBr]:[PMDETA]:[CuBr2] | Time (hr) | Mn (g/mol) | Mn/Mw |
|---|---|---|---|---|---|
| 3 | SDb-01 | 200:1:2:2:0.1 | 9 | 76,900 | 1.76 |
| 4 | SDb-03 | 200:1:2:2:0.1 | 7 | 39,400 | 1.35 |
| 5 | SDb-04 | 200:1:2:2:0.1 | 6 | 23,700 | 1.27 |

Example 6

Under nitrogen atmosphere, a 2 L stainless reactor was charged with cyclohexane 800 g, ditetrahydrofurylpropane 0.08 g, styrene 64 g and butadiene 96 g, and then at a reactor temperature 35° C., n-butyllithium 16 mmol was charged to the reactor, followed by an adiabatic warming reaction. 10 min after the reaction temperature reached the peak temperature, ethylene oxide 0.8 g was introduced thereto, followed by an additional reaction for 10 min. In that state, the reactor temperature was lowered down to 35° C., and then 2-bromoisobutyryl bromide 4.0 g was added thereto to prepare the polymer of Formula 5. Through GPC analysis, it was determined that the weight-average molecular weight was 10,000, and through H-NMR analysis, it was determined that the content of styrene was 41 wt %, the vinyl content of butadiene was 16 wt %.

Figure 11:
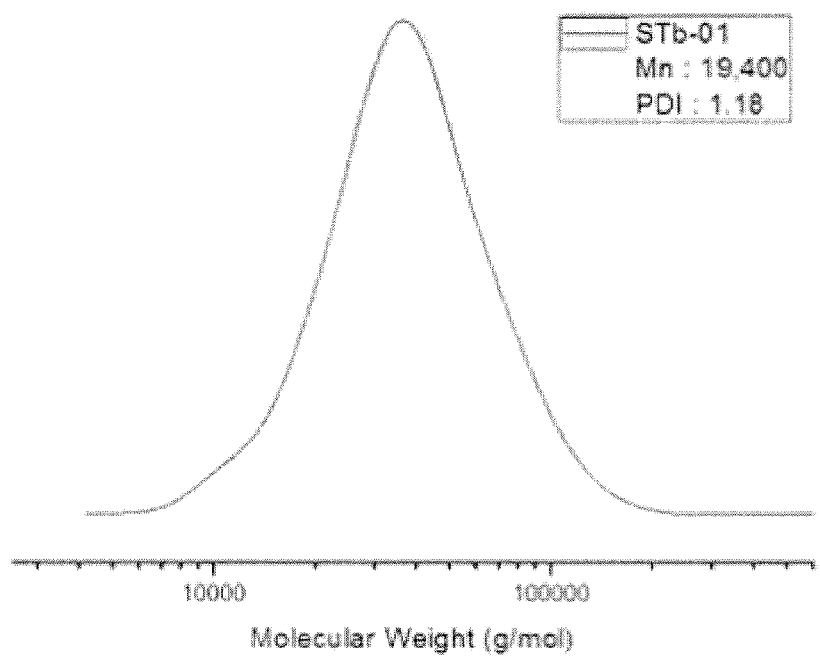
FIGS. 11 and 12 show graphs of GPC and NMR analysis results, respectively, on a polymer synthesized in Example 6 of the present invention.
Figure 12:
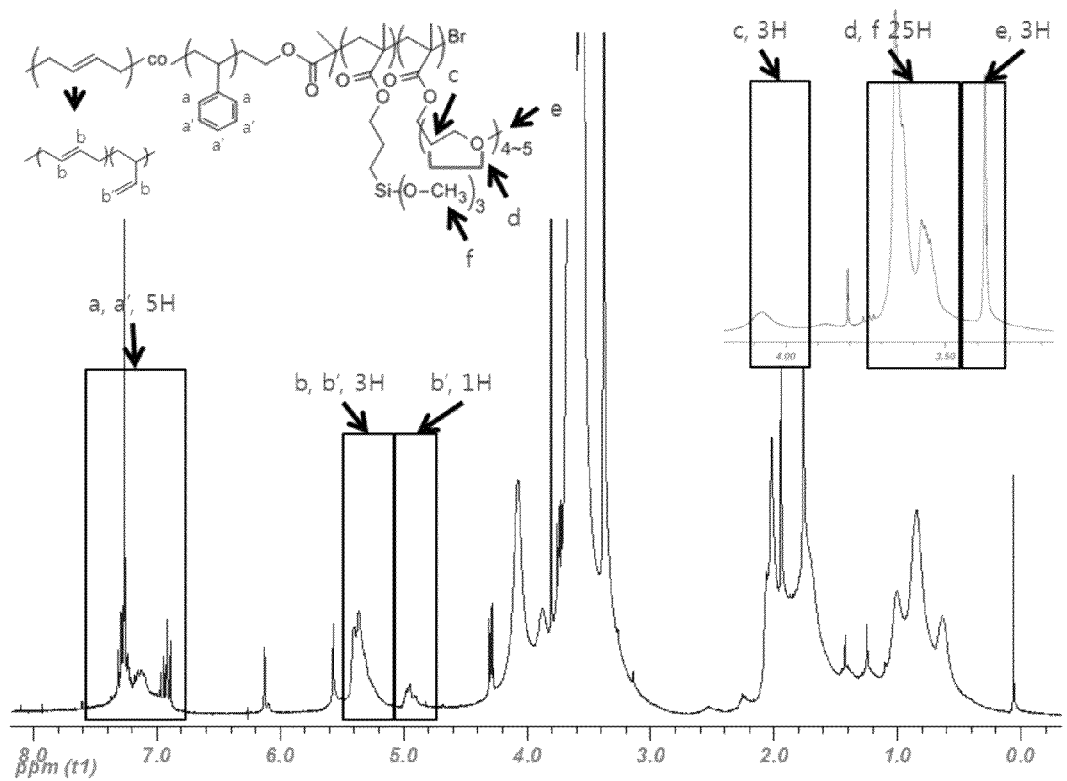

In the charging of [PEGMA300]/[TMSMA]/[Formula 5]/[CuBr]/[PMDETA]/[CuBr2] in a ratio of 200:50:1:2:2:0.1 into a dried 100 mL Schlenk flask, CuBr and CuBr2 were charged first. An inlet was connected to a vacuum pump, thereby placing the flask in a vacuum state, and then nitrogen was charged again thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA (Formula 2), was dried in a vacuum oven for 24 h. The results are noted in Table 2, and GPC and NMR analysis results are shown in FIGS. 11 and 12.

Example 7

Under nitrogen atmosphere, a 2 L stainless reactor was charged with cyclohexane 800 g, ditetrahydrofurylpropane 0.08 g, styrene 64 g and butadiene 96 g, and then at a reactor temperature 35° C., n-butyllithium 16 mmol was charged to the reactor, followed by an adiabatic warming reaction. 10 min after the reaction temperature reached the peak temperature, ethylene oxide 0.4 g was introduced thereto, followed by an additional reaction for 10 min. In that state, the reactor temperature was lowered down to 35° C., and then 2-bromoisobutyryl bromide 2.0 g was added thereto to prepare the polymer of Formula 5. Through GPC analysis, it was determined that the weight-average molecular weight was 10,000, and through H-NMR analysis, it was determined that the content of styrene was 40 wt %, the vinyl content of butadiene was 17 wt %.

Figure 13:
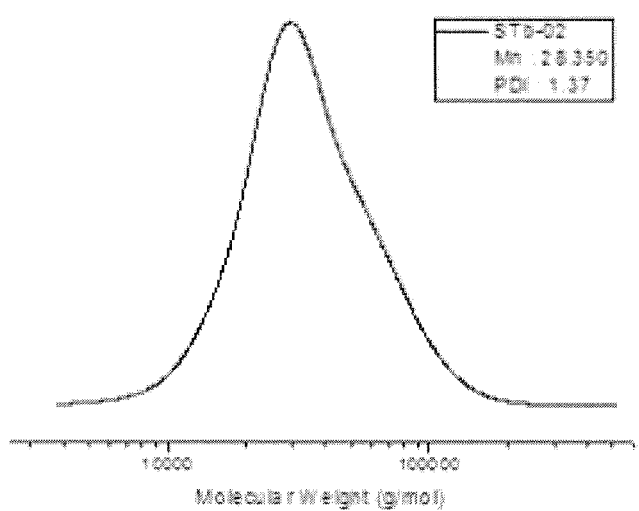
FIGS. 13 and 14 show graphs of GPC and NMR analysis results, respectively, on a polymer synthesized in Example 7 of the present invention.
Figure 14:
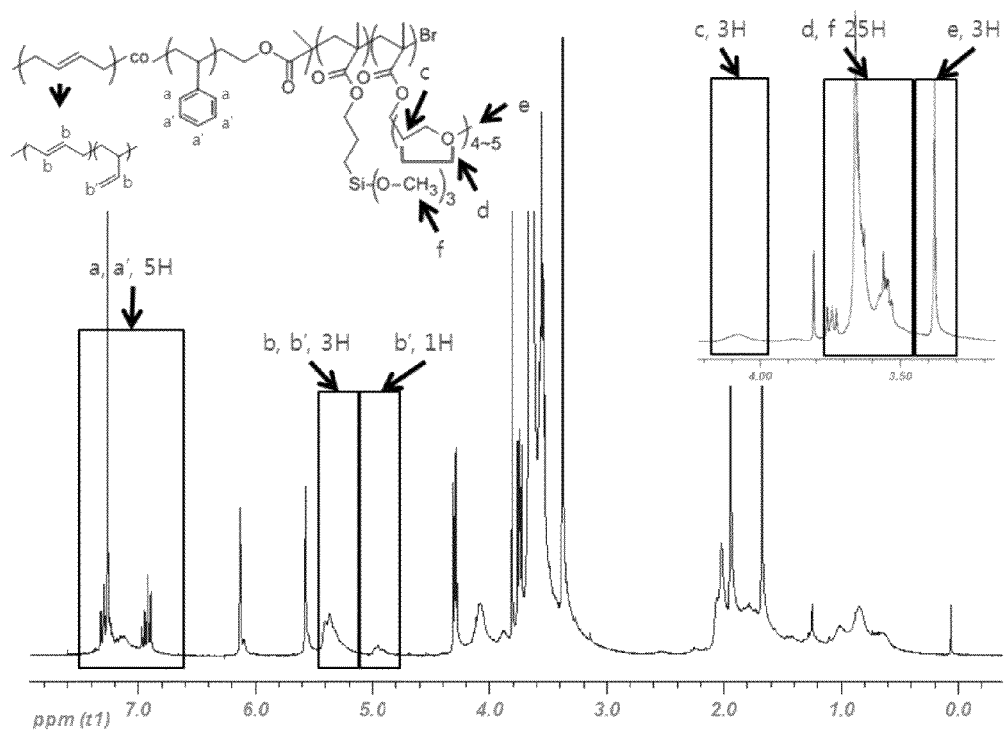

In the charging of [PEGMA300]/[TMSMA]/[Formula5]/[CuBr][PMDETA]/[CuBr2] in a ratio of 200:50:1:2:2:0.1 into a dried 100 mL Schlenk flask, CuBr and CuBr2 were charged first. An inlet was connected to a vacuum pump, thereby placing the flask in a vacuum state, and then nitrogen was charged again thereto. This whole process was repeated 3 to 4 times. Then, anisole having PMDETA, PEGMA300, monomers, and macroinitiator dissolved therein, and anisole to be used as a solvent were charged into glass bottles, respectively. Then, by generating bubbles through nitrogen for 20 min, dissolved oxygen was removed. Then, reagents placed in respective glass bottles were injected into the Schlenk flask by an oxygen-removed syringe, and the flask was sealed after oxygen-removal through nitrogen substitution. In an oil bath of 60° C., the sealed Schlenk flask was immersed, and polymerization was initiated. After the reaction was performed for 5 h, the resultant product was diluted with THF, and flowed into a glass tube filled with alumina to remove Cu. From the Cu-removed solution, THF was removed using an evaporator. Then, the solution was precipitated with hexane, and the resultant polymer was washed with hexane to remove the remaining monomers and solvent. The finally obtained product, SB-b-PEGMA-TMSMA (Formula 2), was dried in a vacuum oven for 24 h. The results are noted in Table 2, and GPC and NMR analysis results are shown in FIGS. 13 and 14.

TABLE 2

| Exp. | Sample | [PEGMA]:[TMSMA]:[Formula 5]:[CuBr]:[PMDETA]:[CuBr2] | Mn (g/mol) | Mn/Mw |
|---|---|---|---|---|
| 6 | STb-01 | 200:50:1:2:2:0.1 | 19,400 | 1.18 |
| 7 | STb-02 | 200:50:1:2:2:0.1 | 28,350 | 1.37 |

Example 8

Under nitrogen atmosphere, a 2 L stainless reactor was charged with cyclohexane 800 g, ditetrahydrofurylpropane 0.02 g, styrene 64 g and butadiene 96 g, and then at a reactor temperature 35° C., n-butyllithium 16 mmol was charged to the reactor, followed by an adiabatic warming reaction. 30 min after the reaction temperature reached the peak temperature, triethoxy(3-glycidyloxypropyl)silane was introduced thereto, followed by stirring for 30 min. Then, ethanol and BHT were introduced thereto to stop the reaction. Through stripping, a polymer of Formula 3 was prepared. The results are noted in Table 3.

Example 9

Under nitrogen atmosphere, a 2 L stainless reactor was charged with cyclohexane 800 g, ditetrahydrofurylpropane 0.02 g, styrene 64 g and butadiene 96 g, and then at a reactor temperature 35° C., n-butyllithium 16 mmol was charged to the reactor, followed by an adiabatic warming reaction. 30 min after the reaction temperature reached the peak temperature, 4,4'-Methylenebis(N,N-diglycidylaniline) was introduced thereto, followed by stirring for 30 min. Then, ethanol and BHT were introduced thereto to stop the reaction. Through stripping, a polymer of Formula 4 was prepared. The results are noted in Table 3.

TABLE 3

| Example | Sample | Mn (g/mol) | Mn/Mw |
|---|---|---|---|
| 8 | SD-L1 | 19,200 | 1.23 |
| 9 | SD-L2 | 15,900 | 1.29 |

TEST EXAMPLES

Test Examples 1 to 5, and Comparative Test Examples 1 to 4

Rubber compositions were prepared according to the compositions noted in table 8 below in which in mixing of rubber with silica, polymers prepared from Examples 1 to 9 were introduced. Then, the compositions were compared to each other in a mechanical property and a dynamic property. In Table 4 below, the ratios of additives introduced in Test Examples are noted, which are compared to Comparative Test Examples 1 to 4 (not introduced with the inventive interfacial polymer). Also, in Table 5 below, Test Examples are compared to Comparative Test Examples 1 to 4 in a mechanical property and a dynamic property.

TABLE 4

| | Test Exp. 1 | Test Exp. 2 | Test Exp. 3 | Test Exp. 4 | Test Exp. 5 | Comp. Test Exp. 1 | Comp. Test Exp. 2 | Comp. Test Exp. 3 | Comp. Test Exp. 4 |
|---|---|---|---|---|---|---|---|---|---|
| interfacial polymer (10 phr) | Exp. 1 | Exp. 2 | Exp. 6 | Exp. 7 | Exp. 8 | — | — | — | — |
| SBR-1739 | 137.5 | 137.5 | 137.5 | 137.5 | 137.5 | 137.5 | 137.5 | 137.5 | 137.5 |
| PEG-4000 | | | | | | | | 5 | 5 |
| Si-69 | — | 4.8 | — | 4.8 | 4.8 | 2.4 | 4.8 | 4.8 | 7 |
| Silica(Zeosil-175) | 60 | 60 | 60 | 60 | 60 | 60 | 60 | 60 | 60 |
| TDAE oil | 37.5 | 37.5 | 37.5 | 37.5 | 37.5 | 37.5 | 37.5 | 37.5 | 37.5 |
| Stearic acid | 1.0 | 1.0 | 1.0 | 1.0 | 1.0 | 1.0 | 1.0 | 1.0 | 1.0 |
| Zinc Oxide | 3.0 | 3.0 | 3.0 | 3.0 | 3.0 | 3.0 | 3.0 | 3.0 | 3.0 |
| BHT | 1.0 | 1.0 | 1.0 | 1.0 | 1.0 | 1.0 | 1.0 | 1.0 | 1.0 |
| TBBS | 1.5 | 1.5 | 1.5 | 1.5 | 1.5 | 1.5 | 1.5 | 1.5 | 1.5 |
| DPG | 0.3 | 0.3 | 0.3 | 0.3 | 0.3 | 0.3 | 0.3 | 0.3 | 0.3 |
| Sulfur | 1.75 | 1.75 | 1.75 | 1.75 | 1.75 | 1.75 | 1.75 | 1.75 | 1.75 |

TABLE 5

| | Test Exp. 1 | Test Exp. 2 | Test Exp. 3 | Test Exp. 4 | Test Exp. 5 | Comp. Test Exp. 1 | Comp. Test Exp. 2 | Comp. Test Exp. 3 | Comp. Test Exp. 4 |
|---|---|---|---|---|---|---|---|---|---|
| Hardness (shore-A) | 57 | 56 | 59 | 58 | 58 | 62 | 60 | 58 | 56 |
| Tensile strength (kgf/cm$^2$) | 205 | 194 | 216 | 223 | 204 | 155 | 175 | 195 | 185 |
| 100% modulus (kgf/cm$^2$) | 44.8 | 48.6 | 49.2 | 45.1 | 47.7 | 38.2 | 39.8 | 40.5 | 42.8 |
| Elongation (%) | 380 | 380 | 340 | 330 | 360 | 240 | 360 | 370 | 360 |
| tan δ (0° C.) | 0.603 | 0.589 | 0.549 | 0.575 | 0.512 | 0.391 | 0.429 | 0.478 | 0.501 |
| tan δ (60° C.) | 0.085 | 0.071 | 0.069 | 0.065 | 0.079 | 0.189 | 0.186 | 0.129 | 0.138 |

What is claimed is:

1. An interfacial polymer for a rubber-silica network, comprising a block copolymer selected from Formulas 1 and 2 below, the block copolymer being obtained by modifying a copolymer containing conjugated diene alone or conjugated diene and vinyl aromatic monomers with an acrylate compound or a glycidyl group-containing compound:

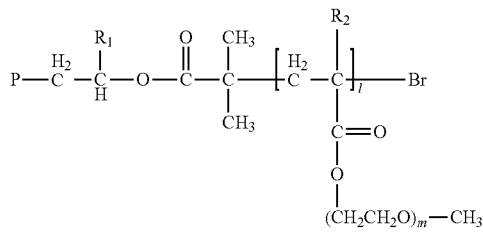

[Formula 1]

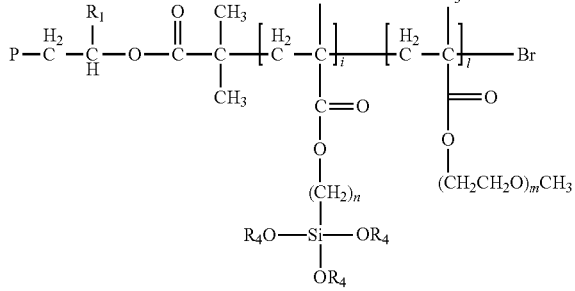

[Formula 2]

wherein in Formulas 1 and 2, P represents a copolymer of conjugated diene alone or conjugated diene and vinyl aromatic monomers; $R_1$ represents hydrogen or a C1 or C2 alkyl group; $R_2$ and $R_3$ each independently represents hydrogen or a C1 to C4 alkyl group; $R_4$ represents a C1 to C5 alkyl group; n represents an integer of 1 to 5; m represents an integer of 1 to 50; and l and i each independently represents an integer of 1 to 100.

2. The interfacial polymer as claimed in claim 1, wherein the conjugated diene of P is butadiene or isoprene.

3. The interfacial polymer as claimed in claim 1, wherein the vinyl aromatic monomers of P are styrene or alpha-methylstyrene.

4. The interfacial polymer as claimed in claim 1, wherein the copolymer of P is obtained by polymerizing vinyl aromatic monomers and conjugated diene in a random, tapered or block architecture.

5. The interfacial polymer as claimed in claim 1, wherein P has a weight-average molecular weight ranging from 1,000 to 500,000.

* * * * *